(12) United States Patent
Johnson et al.

(10) Patent No.: US 7,283,544 B2
(45) Date of Patent: Oct. 16, 2007

(54) AUTOMATIC NETWORK DEVICE ROUTE MANAGEMENT

(75) Inventors: Bruce L. Johnson, Eagle, ID (US); William I. Herrmann, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1072 days.

(21) Appl. No.: 10/310,389

(22) Filed: Dec. 5, 2002

(65) Prior Publication Data

US 2004/0109457 A1    Jun. 10, 2004

(51) Int. Cl.
*H04L 12/28* (2006.01)
(52) U.S. Cl. .................. 370/401; 370/466; 709/245
(58) Field of Classification Search ................ 370/401, 370/465, 248, 466; 709/245
See application file for complete search history.

(56) References Cited

U.S. PATENT DOCUMENTS

| | | | | |
|---|---|---|---|---|
| 5,754,791 A * | 5/1998 | Dahlgren et al. | ........... | 709/242 |
| 6,510,154 B1 * | 1/2003 | Mayes et al. | ................ | 370/389 |
| 6,539,019 B1 * | 3/2003 | Noy et al. | ............. | 370/395.53 |
| 6,741,585 B1 * | 5/2004 | Munoz et al. | ............... | 370/352 |
| 7,054,322 B2 * | 5/2006 | D'Annunzio et al. | ........ | 370/401 |
| 7,143,188 B2 * | 11/2006 | Maufer et al. | .............. | 709/245 |
| 2002/0024959 A1 * | 2/2002 | Kong | ......................... | 370/401 |
| 2002/0112077 A1 * | 8/2002 | Semaan et al. | ............. | 709/245 |
| 2002/0129165 A1 * | 9/2002 | Dingsor et al. | .............. | 709/246 |
| 2003/0076830 A1 * | 4/2003 | Asano | ......................... | 370/392 |
| 2003/0154306 A1 * | 8/2003 | Perry | .......................... | 709/245 |
| 2004/0004968 A1 * | 1/2004 | Nassar | ........................ | 370/401 |

* cited by examiner

*Primary Examiner*—Min Jung

(57) ABSTRACT

Systems, apparatus, and procedures to automatically manage network device routes in a private network are described. In one aspect, a gateway device is operatively coupled to one or more computing devices in the private network. A request for a network address is received from a particular device in the private network. Responsive to receiving the request, a candidate network address is identified. The candidate network address is then evaluated to determine if it is represented in any mapping of an external port on the gateway device to any of the computing devices in the private network. Responsive to determining that the candidate network address is not mapped to any of the computing devices, the candidate network address is mapped to the particular device. These operations automatically create a communication path from the gateway device to the particular device.

18 Claims, 3 Drawing Sheets

AUTOMATIC NETWORK DEVICE ROUTE MANAGEMENT

TECHNICAL FIELD

The invention relates to automatic management of network device addresses.

BACKGROUND

Network Address Translation (NAT) technology allows a gateway or router device to use a particular set of Internet protocol (IP) addresses for internal private message traffic and a different set of IP addresses for external public message traffic. To this end, administrative entities map the private addresses to public addresses and further map a particular port on the router's public interface to a specific device in the private network. This mapping technique is known as port address translation.

For example, to enable an "outbound session", wherein a source device in a private network tries to communicate with a destination device that is outside of the private network, a router device typically allocates a Transmission Control Protocol (TCP) or User Datagram Protocol (UDP) source port for use during the outbound session. The router then replaces the source IP address for each source packet (from a device within the private network) with the IP address of the external or Internet adapter on the gateway device, and replaces the source TCP or UDP port number of the packet with the allocated source port number. In this manner, the gateway device dynamically maps the IP address and source port of the source device to a different IP address and source port (port/address translation).

In the above example, if the destination device sends a response to the router, the port/address mapping that was created during the outbound session is used to restore the source's originating IP address and originating port number. The router then forwards the resulting packets to the correct device in the private network. External devices are unable to initiate connections with devices behind the routing device. In this manner, NAT provides a type of firewall by hiding internal IP addresses from the external devices.

A substantial amount of administrative effort is typically required both to facilitate peer-to-peer connections for devices that reside behind a NAT firewall, and to enable inbound communication sessions. An inbound communication session is where a source device that is not behind the firewall initiates communication with a specific resource that is behind the firewall. This means that a network administrator must typically configure a static NAT route, or static address/port mapping at the router to identify a protected resource's address and gateway port by which the resource can be accessed during an inbound session.

Just as routes to network devices that are behind a NAT gateway are dynamically and/or statically configured, the devices themselves are often dynamically and/or statically configured with network addresses, configuration data, other data, and the like. To illustrate this, consider that a Dynamic Host Configuration Protocol (DHCP) server such as a digital subscriber link (DSL) modem, a cable modem, and/or the like, may assign IP addresses as well as configuration data and other data to devices ("DHCP clients") in a network. Unless a network address is permanently assigned to a specific network device, the DHCP server places an administrator-defined time limit on the address assignment, called a lease. (Permanent address assignment is generally referred to as a reservation).

The lease is the length of time that a DHCP server specifies that a client device can use and assigned IP address. The lease ensures that network addresses are not wasted because network addresses are typically a limited resource. Halfway through the lease period, to maintain the validity of its assigned IP address, a DHCP client must typically request a lease renewal, whereupon the DHCP server may extend the lease.

There are any number of reasons why the DHCP client device may not request lease renewal such as if the client device is malfunctioning, if it has been moved to another network segment, if the device has been retired, and/or the like. If the DHCP client does not request renewal of the lease, it expires. Upon lease expiration, the device's assigned IP address is returned to an address pool for reassignment to a different device.

DHCP network address management can cause a number of significant problems in a NAT protected network. One problem, for example, is that by expiring and reassigning network addresses, the security of the private network may be compromised. To illustrate this, consider that a NAT gateway is maintaining a particular address/port mapping to enable peer-to-peer communication between a protected resource behind the NAT firewall and a device that is on the other side of the firewall. The lease on the protected resource's network address expires, meaning that the address can no longer be used to access the protected resource.

At this point, the NAT route that is mapped at the gateway to the protected device is invalid. If the DHCP server reassigns the expired address to a different device (e.g., a payroll server, a client file server, and/or the like) before a network administrator has had an opportunity to update routing table(s) at the gateway to reflect the invalidated route, the invalid route may be used by a device that is not behind the firewall to gain unauthorized and potentially damaging access to the different device.

The following described systems, apparatus, and procedures address these and other problems of existing techniques to configure and manage device routes in networks.

SUMMARY

Systems, apparatus, and procedures to automatically manage network device routes are described. In one aspect, a gateway device is operatively coupled to one or more computing devices in a private network. A request for a network address is received from a particular device in the private network. Responsive to receiving the request, a candidate network address is identified. The candidate network address is then evaluated to determine if it is represented in any mapping of an external port on the gateway device to any of the computing devices in the private network. Responsive to determining that the candidate network address is not mapped to any of the computing devices, the candidate network address is mapped to the particular device. These operations automatically create a communication path from the gateway device to the particular device.

BRIEF DESCRIPTION OF THE DRAWINGS

The same numbers are used throughout the drawings to reference like features and components.

DETAILED DESCRIPTION

Overview

Even though conventional Network Address Translation (NAT) and network device configuration services (e.g., a DHCP service) may be implemented on a same device, there are a number of problems associated with such conventional implementations. Such problems include the need a network administrator to configure static routes and to remove invalid routes from routing tables. Such existing configuration techniques are generally time-consuming. Additionally, if the routing tables are not updated in a timely fashion to reflect invalid routes, a security breach of a private network resource may result. This means that even dynamically created routes can result in a security breach.

In contrast to such conventional services, the following described subject matter facilitates automatic configuration and management of secure peer-to-peer connections for clients that reside behind a firewall. This is accomplished in part by automatically configuring a gateway device's routing table to indicate a network device's dynamically assigned network address. Such dynamic network address assignment is performed in a manner that substantially eliminates the possibility of improperly assigning a network address that is already in use by another device to the network device. Furthermore, to facilitate secure peer-to-peer connections for clients that reside behind the firewall, the gateway's routing table is automatically updated or managed to accurately reflect/remove invalid routes in a timely manner. These and other aspects of the subject matter are now described in greater detail.

Exemplary System to Configure and Manage a NAT Routing Table

Figure 1:
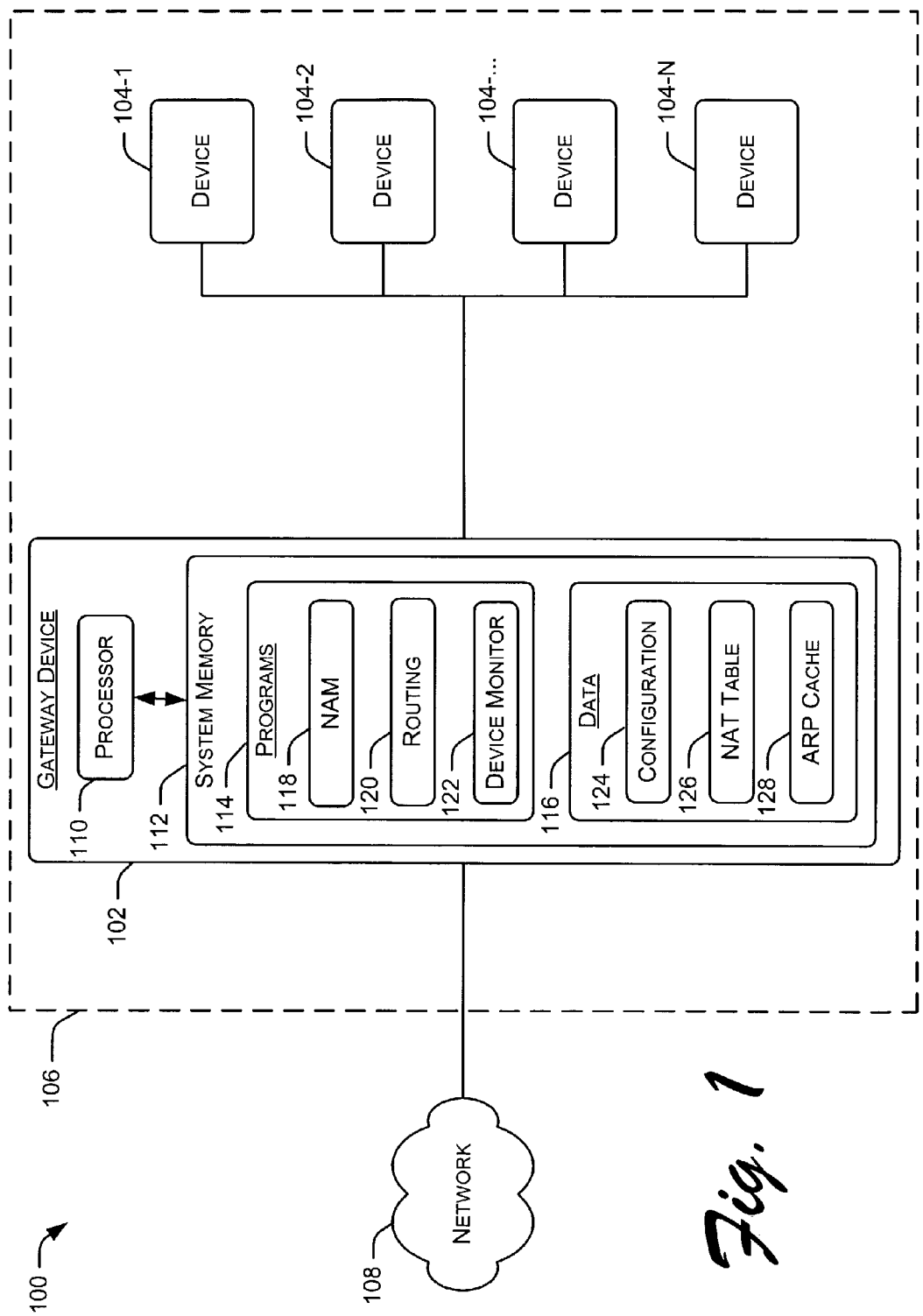
FIG. 1 is a block diagram that shows one embodiment of an exemplary system to automatically configure and manage a routing table of address/port mapping(s) in a gateway device.

FIG. 1 is a block diagram of an embodiment of an exemplary system to configure and manage address to port mapping in a gateway device. The exemplary system is only an example of a suitable computing environment to implement the subject matter and does not suggest any limitation as to the scope of the subject matter. The system includes a gateway device 102 such as a network router, a DSL modem, a cable modem, etc.

Gateway device 102 is coupled to a number of other devices 104 such as a personal computer, a server computer, a printer, other computing and peripheral devices, and/or the like. The gateway device and the other devices 104 form a private network 106 such as a LAN, an organizational intranet, and/or the like.

The gateway device 102 implements NAT by using a particular set of IP addresses for message traffic that is internal to the private network, and a different set of IP addresses for external message traffic to a different network 108. The different network can be another private network and/or a public network such as the Internet. The gateway device also implements dynamic network address configuration (e.g., DHCP) of the other devices 104.

Gateway device 102 includes processor 110 that is coupled to system memory 112. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

Processor 110 is configured to fetch and execute computer-program instructions from application programs 114, and to fetch and/or generate respective portions of data 116 while executing the application programs. Application programs include, for example, network address management module (NAM) 118, routing module 120, device monitor module 122, and other program modules (not shown) such as an operating system to provide a run-time environment. The address management module dynamically assigns configuration data 124 to devices 104 using a configuration protocol such as DHCP. Such configuration data includes, for example, a respective network address and/or one or more external ports numbers. These address and port numbers can be used to provide public network services. Such configuration data is provided in response to a device 104 request, which is made when the device is booted-up into the private network 106.

A device 104 communicates an address request to network address management module (NAM) 118 when the device 104 (hereinafter referred to as the requesting device) does not have an assigned IP address (e.g., a lease on the device's address may have expired), and requires one to establish an outbound communication session with a different device that is not in (i.e., outside) the private network 106. Responsive to receiving such a request for the network address, the network address management module may first validate a candidate network address for the requesting device by determining if the candidate address is already part of a NAT route (identified in the NAT table 126). The candidate network address can be taken from a pool of potential network addresses. If the candidate address is already part of a static or dynamic NAT route, or even in the address resolution cache 128, then the address has already been used. Even though the used address has not yet been removed from the NAT table, the address management module will not assign the candidate address to the requesting device. Instead, the address management module assigns a network address to the requesting device that does not already have a route in the NAT table.

Address management module 118 notifies routing module 120 of the address assignment, whereupon the routing module maps the assigned address to the one or more external ports. This mapping may not occur until the device 104 initiates a connection via the gateway device 102. Each mapped external port is an endpoint to a logical connection (e.g., an endpoint in a TCP/IP and UDP network) from the gateway device 102 to the network 108. To illustrate this, consider that a particular external port may be used for Hypertext Transfer Protocol (HTTP) message traffic between the private network 106 and the network 108. In yet another example, an internal port may indicate a communication path that can be used to access a Web server implemented on a device 104.

In this manner, address management module 118 in combination with routing module 120 provides a one-to-one mapping of public listening/external ports with IP addresses that correspond to devices 104 in the private network 106. Such NAT address/port routes entries are stored in NAT table 126. These address/port routes entries may be used by devices outside of the private network to create communication pathways to clients/devices 104 in the private network. (Individual devices that are not in the private network are not shown).

In one implementation, when a device 104 requests a network address from the address management module 118, the device also indicates one or more external port number's for routing module 120 to use when creating the NAT route(s) for the device. The address management module forwards such port number specifications to the routing module for subsequent mapping. In this manner, the gateway device 102 ensures that unused or obsolete external ports are not assigned to an internal device 104. In one implementation, regardless of whether or not a device specifies a particular port number with which to create a NAT route, the actual port number that is used is forwarded by the routing module to the address management module for subsequent communication to the device 104 is part of its configuration data.

If network address management (NAM) module 118 expires the lease on a device's 104 assigned network address (e.g., because it was not renewed by the device), the address management module notifies the routing module 120 of the invalid/expired network address. In response, the routing module invalidates all mapped routes that include the expired network address from the NAT table 126. Such invalidation may be accomplished in a number of ways. For example, an invalid NAT route entry may be flagged in the table as invalid, the invalid NAT route entry may be removed from the NAT table, and the like. Thus, as long as the network addresses' lease is active on the network address management server and as long as the NAT route does not indicate a shorter duration of route validity, the route in the NAT table is maintained by the gateway device 102.

In one implementation, gateway device 102 includes device monitor module 122 to determine whether or not a specific network address is still active with respect to a particular device 104 in the private network. Specifically, the monitor module evaluates the contents of an ARP cache 128 to determine if the specific address is valid with respect to the particular device. The ARP cache maps a device's IP address to the device's hardware address, or vice versa, the device's hardware address to the device's IP address ("RARP", or "Reverse" ARP). When a device responds to an ARP request, its IP address is mapped into the ARP cache to indicate that the device has responded—this also indicates that the device is active on the network). If the device does not respond to the ARP request, the device's IP address is removed and/or invalidated in the ARP cache.

Device monitor module 122 evaluates the contents of ARP cache 128 by determining if the network addresses mapped into NAT table 126 (a routing table) are valid addresses in the ARP cache. If a particular address has been invalidated/expired from the ARP cache, it is likely that the device corresponding to the invalidated address is malfunctioning, has been removed from the network, has been assigned a different address (e.g., by network address management (NAM) module 118), and/or the like. To this end, the device monitor module provides such information to routing module 120 to invalidate or remove the device's corresponding route entry (the device's address/port mapping) from the NAT table.

In one implementation, routing module 120 "pings" target device(s) 104 just before expiring a route entry from NAT table 126. Existing ping message protocols include, for example, the Internet Control Message Protocol (ICMP). If the device responds to a ping, then the address's route entry or entries will not be invalidated or removed from the NAT table. However, if the device does not respond to the ping, then the address's NAT route entry or entries will be invalidated/removed from the NAT table.

Accordingly, configuration and management of NAT routes in system 100 is automated, simplified, and provides for improved security of the internal LAN. Moreover, the system provides for automatic removal of invalid routes from the NAT table 126 by exploiting other target device 104 status information such as network address lease expiration, the contents of an ARP cache 128, and so on.

Computer-Executable Instructions

The systems, apparatus, and procedures are illustrated in the drawings as being implemented in a suitable computing environment. Although not required, the systems, apparatus, and procedures are described in the general context of computer-executable instructions, such as programs 118 through 122 that are executed by a computing device such as gateway device 102. Programs typically include routines, program modules, objects, components, data structures, etc., that perform particular tasks or implement particular abstract data types.

The systems, apparatus, and procedures may be practiced on any of a number of different computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices (computer-readable media).

An Exemplary Procedure

Figure 2:
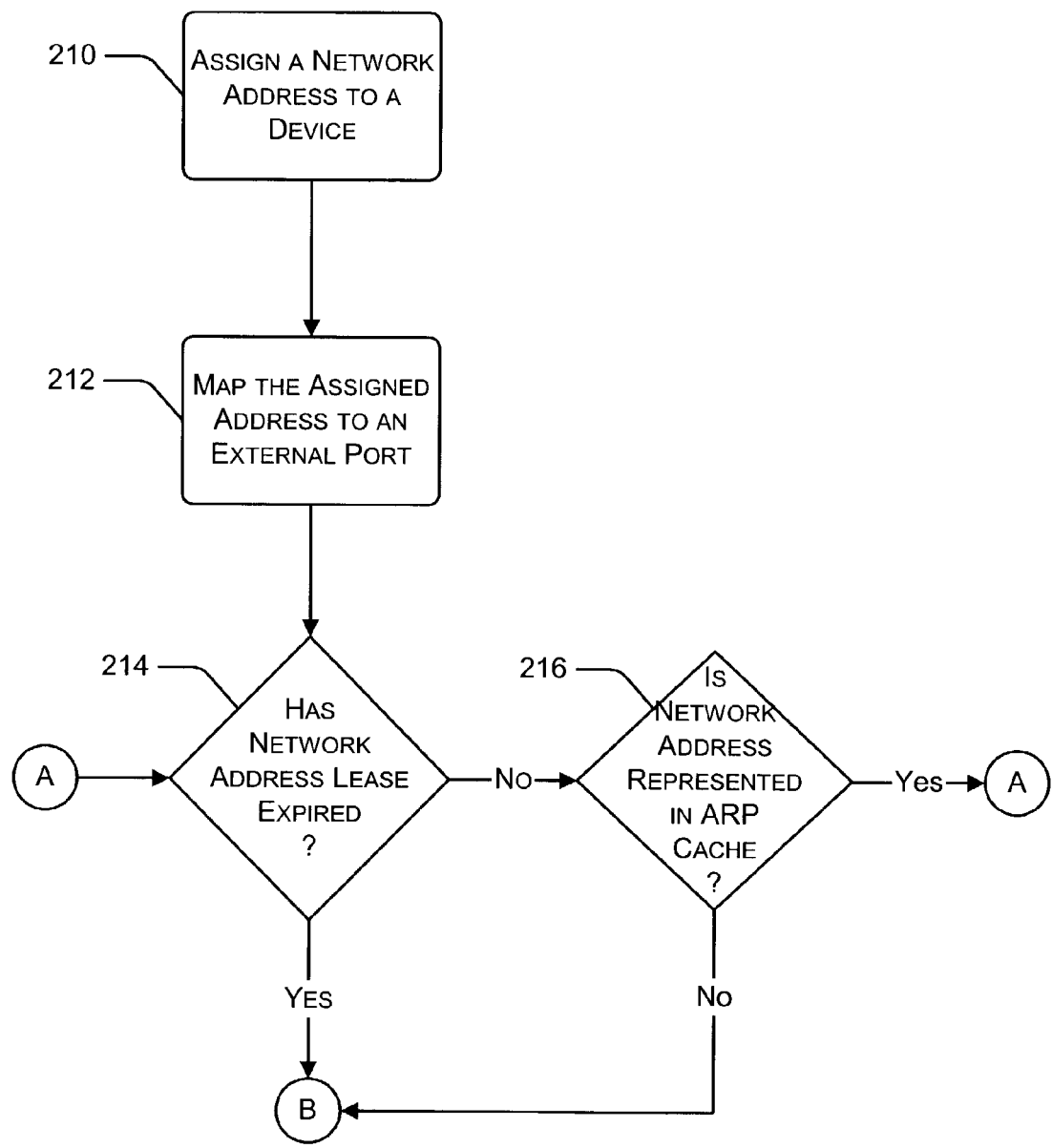
FIG. 2 is a flowchart that shows one embodiment of an exemplary procedure to automatically configure and manage device routes in a gateway device.

FIG. 2 shows an exemplary procedure 200 to automatically configure and manage address translation route mapping in a gateway device. For purposes of discussion, the procedure is described in combination with various components of FIG. 1. At block 210, the procedure assigns a network address to a device. At block 212, the procedure automatically maps the network address to an external port number to create a route (routing module 120 of FIG. 1). The route operatively configures a communication path through the gateway device to the device. At block 214, the procedure determines if a time-lease on the assigned network address has expired. As discussed above, this information is provided by network address management module 118 DHCP operations. If the lease on the assigned network address has expired (block 214), the procedure continues as described below at block 310 of FIG. 3 as indicated by on-page reference "B".

At block 216, if the lease has not expired, procedure 200 evaluates ARP cache 128 (FIG. 1) to determine if the assigned network address has been dropped from the cache. (See, also the description above in reference to the device monitor module 122 of FIG. 1). If not, the procedure continues at block 214 as indicated by on-page reference "A". If the network address has been dropped from the cache (block 216), the procedure continues from block 216 to block 310 of FIG. 3, as indicated by on-page reference "B".

Figure 3:
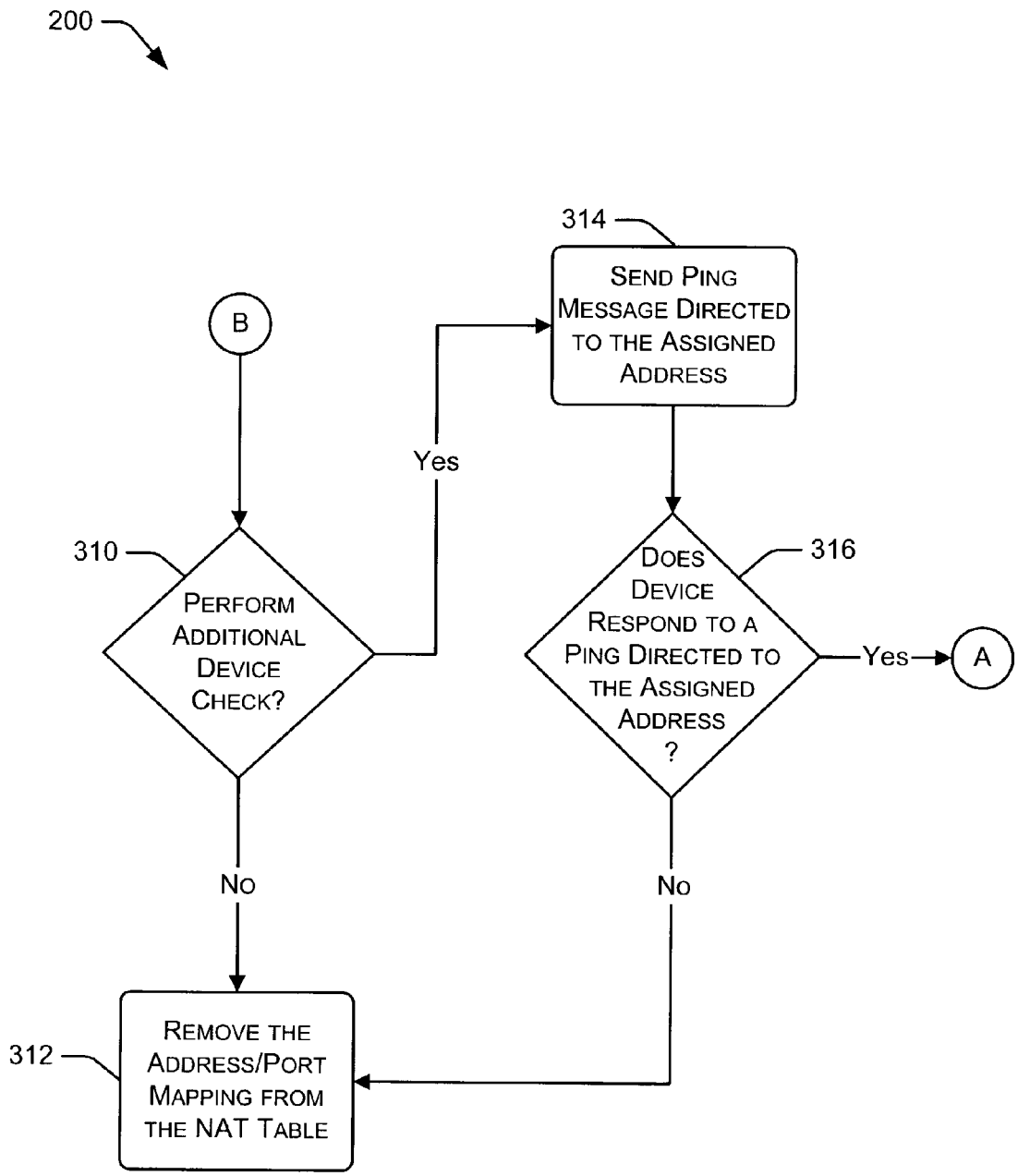
FIG. 3 is a flowchart that shows further embodiments of an exemplary procedure to automatically configure and manage device routes in a gateway device.

FIG. 3 shows further embodiments of the exemplary procedure of FIG. 2 to automatically configure and manage address translation route entries in a gateway device 102 (FIG. 1). At block 310, it has either been determined that the time-lease on an assigned network address has expired (block 214 of FIG. 2), or it was determined that the time lease did not expire and that the network address was dropped from the ARP cache (block 216 of FIG. 2). Thus, at block 310, the procedure determines if an additional check on the validity of the assigned network address is to be performed. In one implementation, such a determination is made by the routing module 120 of FIG. 1.

At block 314, it having been determined at block 310 that an additional address validity check is to be performed, the procedure sends a request such as a ping to the assigned network address. This operation is performed to determine if the corresponding device is functioning, and if so, to determine its current network address. At block 316, the procedure determines if the device responded to the request message (e.g., a ping). If so, the procedure continues at block 214 of FIG. 2, as indicated by on-page reference "A". Otherwise, if no additional determination of the validity of the address is to be made (block 310), or if the device did not respond to a request message (block 316), the procedure at block 312 invalidates/removes the addresses' corresponding NAT route entry, or entries from routing table 126 (FIG. 1).

Conclusion

The various implementations of the described subject matter enhance the overall performance of traditional NAT and dynamic network address management functions. For example, in contrast to conventional routing table management procedures, which typically require a network administrator to configure static address translation routes, the described subject matter automatically configures static NAT routes without administrator intervention. Moreover, in contrast to existing systems and procedures, which typically require a network administrator to identify and update invalid NAT routes, the inventive subject matter dynamically updates a gateway's routing table to reflect/remove invalid network address communication paths in response to a determination that a device is no longer available, and in response to the expiration of a device's network address.

Furthermore, in contrast to conventional network address management functions, which typically expire/reassign a network address only if its lease is not renewed, as soon as a device 104 (FIG. 1) is determined not to be working (e.g., via evaluation of ARP cache 128 (FIG. 1) or use of a ping message), network address management (NAM) module 118 (FIG. 1) is notified that the corresponding network address is available for expiration/reassignment to a different device 104 (FIG. 1).

Although the systems, apparatus, and procedures have been described in language specific to structural features and/or methodological operations, it is to be understood that the subject matter defined in the appended claims is not necessarily limited to the specific features or operations described. Rather, the specific features and operations are disclosed as forms of implementing the claimed subject matter.

The invention claimed is:

1. In a private network including a gateway device operatively coupled to one or more networked computing devices, a method for automatic device route management, the method comprising:
    receiving a request for a network address, the request being communicated by a particular device of the one or more networked computing devices;
    responsive to receiving the request, automatically:
    identifying a candidate network address;
    evaluating the candidate network address to determine if it is represented in any mapping of an external port on the gateway device to any of the networked computing devices; and
    responsive to determining that the candidate network address is not mapped to any of the networked computing devices, mapping the candidate network address to the particular device to create a communication path from the gateway device to the particular device.

2. A method as recited in claim 1, wherein the request further comprises a request for a specific external port number on the gateway device, and wherein the external port number is the specific external port number, and wherein the communication path maps the specific external port number to the particular device.

3. A method as recited in claim 1, wherein the candidate network address is a network address, the method further comprising:
    automatically determining that the network address no longer represents a valid communication path from the gateway device to the particular device; and
    responsive to the determining, invalidating the communication path.

4. A method as recited in claim 3, wherein automatically determining that the network address no longer represents a valid communication path further comprises:
    communicating a message to the network address, the message requiring a response; and
    responsive to determining that the response is not forthcoming, considering the communication path to be invalid.

5. A method as recited in claim 3, wherein automatically determining that the network address no longer represents a valid communication path further comprises identifying an expired time lease corresponding to the network address.

6. A method as recited in claim 3, wherein automatically determining that the network address no longer represents a valid communication path further comprises determining that the network address is not represented in an address resolution cache.

7. A method as recited in claim 3, wherein invalidating the communication path further comprises removing the communication path from a routing table.

8. A computer-readable medium comprising computer-program instructions executable by a processor for automatically managing network device routes, the computer-program instructions comprising instructions for:
    mapping a network address to an external port on a gateway device to create a communication path through a gateway device to a particular device of one or more computing devices in a private network;
    determining that the network address is no longer valid, wherein the computer-program instructions for such determining further comprise instructions for:
    communicating a message to the network address, the message requiring a response; and
    responsive to determining that the response is not forthcoming, considering the communication path to be invalid; and responsive to determining that the network address is no longer valid, invalidating the communication path.

9. A computer-readable medium comprising computer-program instructions executable by a processor for automatically managing network device routes, the computer-program instructions comprising instructions for:
    mapping a network address to an external port on a gateway device to create a communication path through a gateway device to a particular device of one or more computing devices in a private network;
    determining that the network address is no longer valid, wherein the computer-program instructions for such determining further comprise instructions for determining that a time lease corresponding to the network address has expired; and responsive to determining that the network address is no longer valid, invalidating the communication path.

10. A computer-readable medium comprising computer-program instructions executable by a processor for automatically managing network device routes, the computer-program instructions comprising instructions for;

mapping a network address to an external port on a gateway device to create a communication path through a gateway device to a particular device of one or more computing devices in a private network;

determining that the network address is no longer valid; and responsive to determining that the network address is no longer valid, invalidating the communication path, wherein the computer-program instructions for such invalidating further comprise instructions for removing the communication path from a routing table.

11. A computer-readable medium comprising computer-program instructions executable by a processor for automatically managing network device routes, the computer-program instructions comprising instructions for:

mapping a network address to an external port on gateway device to create a communication path through a gateway device to a particular device of one or more computing devices in a private network;

determining that the network address is no longer valid, wherein the computer-program instructions for such determining further comprise instructions for determining that the network address is not represented in an address resolution cache; and responsive to determining that the network address is no longer valid, invalidating the communication path.

12. A computer-readable medium comprising computer program instructions executable by a processor for automatically managing network device routes, the computer-program instructions comprising instructions for:

mapping a network address to an external port on a gateway device to create a communication path through a gateway device to a particular device of one or more computing devices in a private network;

determining that the network address is no longer valid;

responsive to determining that the network address is no longer valid, invalidating the communication path receiving a request from the particular device, the request indicating a candidate network address and a specific external port number, the external port number being the specific external port number;

responsive to receiving the request, automatically;

evaluating the candidate network address to determine if it is represented in any mapping of an external port on the gateway device to any of the computing devices; and responsive to determining that the candidate network address is not mapped to any of the networked computing devices, mapping the candidate network address to the particular device to create the communication path.

13. A gateway device for automatically managing private network device routes, the gateway device comprising:

a processor:

a memory coupled to the processor, the memory comprising computer-program instructions executable by the processor for:

automatically mapping particular ones of multiple external ports on the gateway device to respective network addresses, the respective network addresses corresponding to requesting ones of one or more computing devices in a private network; and dynamically updating a routing table maintained by the gateway to reflect external port and network address mappings within the private network;

wherein the computer program instructions for automatically mapping particular ones of multiple external ports on the gateway device to respective network addresses further comprise instructions for:

receiving a request from a particular device of the one or more computing devices, the request indicating a candidate network address and a specific port number of the multiple external ports;

responsive to receiving the request, automatically:

evaluating the candidate network address to determine if it is represented in any communication path mapping in the routing table; and responsive to determining that the candidate network address is not represented in any such communication path mapping, assigning the candidate network address to the particular device to create a communication path based on the candidate network address and the specific external port, a network address to an external port.

14. A gateway device for automatically managing private network device routes, the gateway device comprising:

a processor;

a memory coupled to the processor, the memory comprising computer-program instructions executable by the processor for:

automatically mapping particular ones of multiple external ports on the gateway device to respective network addresses, the respective network addresses corresponding to requesting ones of one or more computing devices in a private network;

dynamically updating a routing table maintained by the gateway to reflect external port and network address mappings within the private network;

determining that a particular address of the respective network addresses is no longer valid; and responsive to determining that the particular address is invalid, removing a communication path corresponding to the particular address from the routing table.

15. A gateway device as recited in claim 14, wherein the computer program instructions for determining that the particular address is no longer valid further comprise instructions for:

communicating a message to the particular address, the request message requiring a response; and determining tat the response from a device associated with the particular address is not forthcoming.

16. A gateway device as recited in claim 14, wherein the computer program instructions for determining that the particular address is no longer valid further comprise instructions for:

determining that a time lease on the particular address has expired; or determining that the particular address is not represented in an address resolution cache.

17. A gateway device for automatically managing private network device routes, the gateway device comprising:

means for automatically mapping particular ones of multiple external ports on the gateway device to respective network addresses, the respective network addresses corresponding to requesting ones of one or more computing devices in a private network;

means for dynamically updating a routing table maintained by the gateway to reflect external port and network address mappings within the private network;

means for receiving a request from a particular device of the one or more computing devices, the request indicating a candidate network address and a specific port number of the multiple external pods;

responsive to receiving the request, means for automatically:

evaluating the candidate network address to determine if it is represented in any communication path mapping in the routing table; and responsive to determining that the candidate network address is not represented in any such communication path mapping, assigning the candidate network address to the particular device to create a communication path based on the candidate network address and the specific external port, a network address to an external port.

18. A gateway device for automatically managing private network device routes, the gateway device comprising:

means for automatically mapping particular ones of multiple external ports on the gateway device to respective network addresses, the respective network addresses corresponding to requesting ones of one or more computing devices in a private network;

means for dynamically updating a routing table maintained by the gateway to reflect external port and network address mappings within the private network;

means for determining tat a particular address of the respective network addresses is no longer valid; and responsive to determining that the particular address is invalid, means for removing a communication path corresponding to the particular address from the routing table.

* * * * *

UNITED STATES PATENT AND TRADEMARK OFFICE
CERTIFICATE OF CORRECTION

PATENT NO. : 7,283,544 B2
APPLICATION NO. : 10/310389
DATED : October 16, 2007
INVENTOR(S) : Bruce L. Johnson et al.

It is certified that error appears in the above-identified patent and that said Letters Patent is hereby corrected as shown below:

In column 8, line 38, in Claim 7, delete "farther" and insert -- further --, therefor.

In column 9, line 9, in Claim 10, delete "for;" and insert -- for: --, therefor.

In column 9, line 25, in Claim 11, after "port on" insert -- a --.

In column 9, lines 36-37, in Claim 12, delete "computer program" and insert -- computer-program --, therefor.

In column 9, line 52, in Claim 12, delete "automatically;" and insert -- automatically: --, therefor.

In column 9, line 64, in Claim 13, delete "processor:" and insert -- processor; --, therefor.

In column 10, line 48, in Claim 15, delete "computer program" and insert -- computer-program --, therefor.

In column 10, line 53, in Claim 15, delete "tat" and insert -- that --, therefor.

In column 10, line 56, in Claim 16, delete "computer program" and insert -- computer-program --, therefor.

UNITED STATES PATENT AND TRADEMARK OFFICE
CERTIFICATE OF CORRECTION

PATENT NO. : 7,283,544 B2
APPLICATION NO. : 10/310389
DATED : October 16, 2007
INVENTOR(S) : Bruce L. Johnson et al.

It is certified that error appears in the above-identified patent and that said Letters Patent is hereby corrected as shown below:

In column 11, line 9, in Claim 17, delete "pods" and insert -- ports --, therefor.

In column 12, line 12, in Claim 18, delete "tat" and insert -- that --, therefor.

Signed and Sealed this

Twenty-ninth Day of July, 2008

JON W. DUDAS
*Director of the United States Patent and Trademark Office*